(12) United States Patent
Conte et al.

(10) Patent No.: US 6,774,302 B2
(45) Date of Patent: Aug. 10, 2004

(54) METHOD FOR MAINTENANCE OF OVERHEAD LINE PLANTS FOR TELECOMMUNICATIONS

(75) Inventors: Giuseppe Conte, Pozzuoli (IT); Paolo Battistini, Follonica (IT); Manrico Tuci, Follonica (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 10/257,670

(22) PCT Filed: Apr. 11, 2001

(86) PCT No.: PCT/IT01/00182
§ 371 (c)(1),
(2), (4) Date: Oct. 15, 2002

(87) PCT Pub. No.: WO01/80390
PCT Pub. Date: Oct. 25, 2001

(65) Prior Publication Data
US 2003/0146009 A1 Aug. 7, 2003

(30) Foreign Application Priority Data
Apr. 14, 2000 (IT) .................................... RM2000A0198

(51) Int. Cl.[7] ............................................... H02G 13/00
(52) U.S. Cl. .................. 174/40 R; 174/45 R; 403/305; 52/148; 52/149; 52/150
(58) Field of Search ............................ 174/40 R, 45 R; 403/305; 52/148, 149, 150

(56) References Cited

U.S. PATENT DOCUMENTS

1,669,719 A    5/1928   Marshall

*Primary Examiner*—Dean A. Reichard
*Assistant Examiner*—Jinhee Lee
(74) *Attorney, Agent, or Firm*—Young & Thompson (57) ABSTRACT

A method or the realisation and the maintenance of overhead line plants for telecommunications, in which the anchor or "mooring" device of the self-gripping two-way supports of the cables, is made integral with a movable structure free to move along the supporting post. The structure includes a chain allowing lowering of the line from span level to ground level, and its successive lifting to the predetermined operative height at the end of the maintenance intervention. The lowering of the line to the ground level is achieved by exploiting the gravity force acting on the line itself, and the successive lifting, by pulling this anchor chain. The movable structures are provided according to different configurations, depending on the characteristics of the posts where these structures are used.

16 Claims, 8 Drawing Sheets

METHOD FOR MAINTENANCE OF OVERHEAD LINE PLANTS FOR TELECOMMUNICATIONS

TECHNICAL FIELD

The present invention generally refers to the realisation, and to the execution modalities for operation and maintenance of overhead lines for telecommunications, comprising a cable sustained by posts, and more particularly it relates to movable anchoring or "mooring" devices which permit the realisation of the overhead line and the performance of maintenance works without the intervention of technicians at a certain height above the ground.

BACKGROUND ART

The wide diffusion of the network formed by cables sustained by posts and the realisation modality of these plants, are critical with regard to operation and maintenance, in view of the costs involved, the service quality, and the safety conditions during the execution of the work.

These critical aspects are essentially due to the requirement of the access of technicians at a certain height above the ground, and to different orographic and environmental characteristics of the territory where the posts are installed.

In fact, besides the stability conditions of the plants themselves, the actual environmental and orographic features of the territory will determine both the possibility of access to a position located a certain height above the ground level, and the way this is to be done: use of a controlled platform, a ladder, crampons (climbing irons).

Naturally, a comparison between the means employed and the time required for the work, on the one hand, and the quality of the intervention and the safety of the personnel, on the other hand, leads to different results, for each modality of access at a certain height above ground level, but in all cases they do not lead to optimum results.

An object of the present invention is to provide a method of realisation of overhead line plants for telecommunications via cable, which radically limits the number of necessary interventions to be performed by the appointed technicians, at a certain height above the ground level.

A further object of the present invention is to provide a method allowing the maintenance and the replacement of cables to be performed directly from the ground, thereby eliminating the need for access at a certain height above ground level.

Still another object of the present invention is to provide a method of realisation and maintenance of overhead line plants for telecommunications, said plants crossing road paths, and wherein the method allows the maintenance and the replacement of cables to be performed directly from the ground, without the need of lowering the overhead line to the road level and stopping vehicle traffic.

A last object of the present invention is to provide a method of realisation and maintenance of overhead line plants for telecommunications, which employs standard components, materials and technologies in the field of fixed line telephone plants, so that the proposed devices used to carry out the method, will have limited costs and their use is facilitated.

DISCLOSURE OF INVENTION

These and other objects which will be clarified in the description, are obtained by means of a method according to which the mooring or anchor device of the self-gripping two-way supports which sustain the cables, is made integral to a movable structure—and not to fixed points relative to the post by the use of known threaded pins—, wherein the movable structure is free to slide along the sustaining post and comprises a chain allowing to lower the overhead line to the countryside ground level, and its subsequent lifting at the end of the maintenance intervention. The lowering of the line to the ground level may be obtained by exploiting the action of the gravity force.

BRIEF DESCRIPTION OF DRAWINGS

Preferred embodiments of the invention will now be described for illustrative purposes only, without thereby limiting the generality and possible applications thereof, by referring in the description to the annexed drawings, in which.

MODES FOR CARRYING OUT THE INVENTION

First of all, it must be noted that for clearness purposes the different views have been schematically drawn, in such a way that constructive details, whose presence is obvious but which are not relevant for the description of the relative embodiment, have been omitted from the views, and in the latter the same component is always denoted by the same numeral.

According to the kind of post, and to the function it performs, different realisations of specific, movable mooring (anchoring) devices are provided, all having—however—the fundamental object to allow maintenance works to be performed without the need of acceding to a position at a certain height above the ground level.

Therefore, it is advisable to consider first of all, the different types of posts present in an overhead line for telecommunications, which is used for cable transit and for related functions.

The line branches off from a starting post, which sustains the shunt (or branch) box used for the branching off of the cables to the user; usually, according to the law in force, a number of cables between 1 and n, may branch off from said box.

Instead, a transit post is characterised only by the feature of having a cable support buckle at its apex, at the span height; in practice, its only function is to support the cable span (cable bay).

A corner post is a post allowing a deviation of the line. In fact, the latter may be forced to deviate from the normal rectilinear path, thereby changing its direction, due to terrain morphology or for any other reason.

Moreover, it must be noted that cable coils (skeins) have a length of 300 m, while the distance from one post to the next (usually called span) varies between 35 and 40 meters, so that, in practice, every eight posts there is a cable coil termination.

Therefore, a junction post is defined as a post where the end of the arriving cable coil is connected to the starting portion of a new cable coil termination.

A sectioning post, is a particular kind of post comprised among the eight posts which usually define the 300 m-long cable section (it may for instance be located 150 m away from the starting post), and it is provided for the following purposes:

to carry out tests, and in order to be able to intervene, depending on the location of the failure, by replacing only a limited cable section instead of the whole section of coil length.

Moreover, it must be stated beforehand that in already existing overhead lines there is usually used at least a couple of self-pressing or self-gripping two-way supports, whose function substantially amounts to tensioning the cable, besides making available a certain amount of cable stock length for the performance of cutting or reconnecting operations in the course of maintenance works.

In the posts according to the prior art, said self-pressing or self-gripping two-way supports are—in fact—mounted in a fixed manner on a post, since the access by a technician, to a position located a certain height above the ground, is taken for granted, both during the realisation of the telecommunication line itself, when the cable is laid on the self-gripping support, and during the subsequent maintenance of the same.

The method according to the present invention, while resorting again to the use of self-gripping two-way supports, provides for a movable anchoring thereof on the post, so that, after all, it will be shown how the cable and its supports may be made to descend to the road/field (ground) level, thereby allowing a maintenance operation to be performed at ground level.

In order to simplify the description of the embodiments of the invention, it is advisable to consider first of all—among the different implemented embodiments—, a particular structure which provides for the use of an integrated device assembly, in order to carry out the maintenance method of overhead line plants for telecommunications, by the use of a movable mooring (anchoring) apparatus. In the following, reference will be made to a structure mounted on the sectioning/junction post, which is used for possible ordinary maintenance works, and only afterwards we will discuss other types of embodiments.

The rectilinear line section is only a particular typology considered by the present invention, and in this specific case the line is characterised by the transit of four cables, so that the stresses involved, acting on the anchoring or mooring devices, are four times higher than for line sections supporting a single cable. For this reason, it is necessary that the technician is enabled to perform the maintenance work on the line, after the latter has been transferred to the ground level, without any sort of unbalances being present in the traction forces exerted between the cables of the line.

For instance, during the cutting and replacement operations of a single cable among the four actually present on the line, the latter would be subjected to a traction in one direction, higher than in another one, and this unbalance of the forces present on the line, would certainly render more difficult the operation to be performed by a technician.

Figure 1:
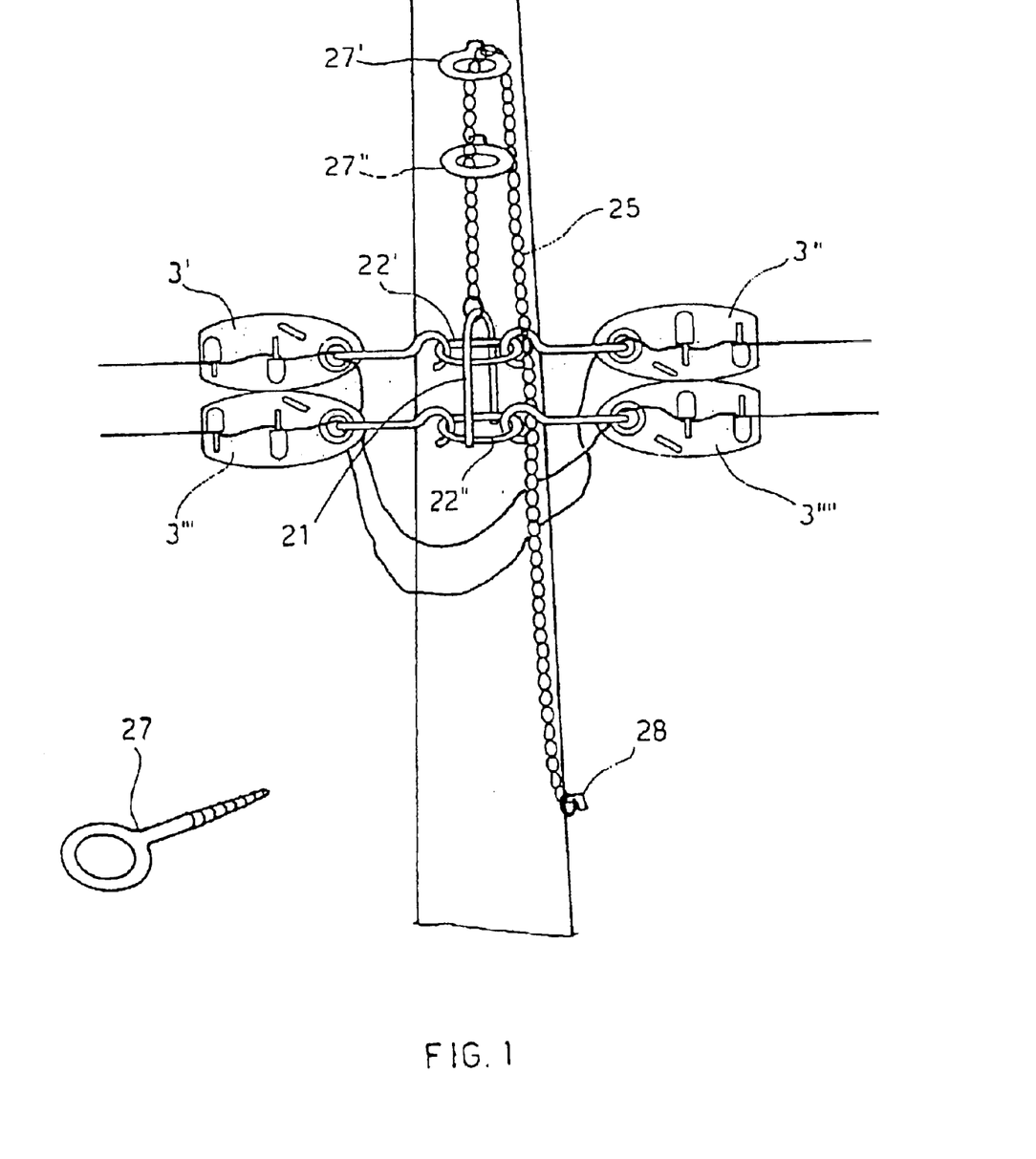
FIG. 1 is a schematic representation of a complete "mooring" or anchor device, to be applied to a sectioning/junction post, in a rectilinear line section with four cables.

For these reasons, and in particular for the rectilinear section of the line, there is provided an anchoring or mooring device according to the present invention, which is positioned on the sectioning/junction post by the use of a chain of 2.50 m of length, which—as shown in FIG. 1—supports a sort of small cage comprising an anchor element 21, in the form of an inverted "U"; on the latter, there are welded two spacers 22', 22" with an elliptical, flattened configuration, which are hooked by four self-gripping supports 3', 3", 3''', 3''''. This device is in fact effective for supporting even a greater number of cables and lines on the same post.

The chain 25 may slide through the upper pin-ring 27' and the lower pin-ring 27", thereby allowing lowering or lifting of the span level. Moreover, the chain 25 is fixed to two special hooks, being first engaged with the hook retainer 28 at a level of about 4.50 m, and extending thereafter upwards to a height of 5.00 m, where it is ultimately fixed by means of a safety hook which is not shown in FIG. 1, since it is disposed on the rear side of the post considering the orientation in this figure.

The disconnection of the chain from these two retainers, and the lowering of the span to a level corresponding to the height of a human being, will only be possible by the use of a rod carrying a specific means or attachment.

Therefore, basically, it is possible to distinguish between two specific positions of the line at a sectioning/junction post, that is:

I) line is operative at the span position, wherein the chain 25 sustains four self-pressing or self-gripping supports 3', 3", 3''', 3'''', and is fixed by a first retainer 28 and by a second—safety—retainer which are both fixedly arranged on the post, the first of said retainers being located at a lower level than the second one;

II) the line is in the lowered state, or "maintenance state", wherein the chain 25 which still supports the four self-gripping devices 3', 3", 3''', 3'''' by means of the small cage 21, has been disengaged from said retainers and has been made to slide, while hooked by a small rope provided with a spring catch, in order to be lifted again at the end of the maintenance operation.

From the strict point of view of the design, taking also account of the order of magnitude of the distances involved in this application, the two anchor rings 27', 27" may be fixed at a height of 5.50–6.20 m, spaced apart from each other by a vertical distance of 10 cm, the said rings being used for receiving the movable mooring—or anchor—device having a cage-like configuration 21, whose lateral ends are hooked by the self-pressing or gripping supports 3', 3", 3''', 3'''' carrying the arriving line (incoming line) and the outgoing line.

The retainer 28 and the safety retainer, are both fixed on the same post, at a height comprised in the interval 4.50–5.00 m.

The end 21 of the "mooring device", is anchored to the chain, and the latter, after having been unhooked, while sliding through the rings, allows lowering or lifting of the line. Under stability conditions the chain is fixed, in a stretched state, to both the fixing retainer and the safety retainer.

Figure 2:
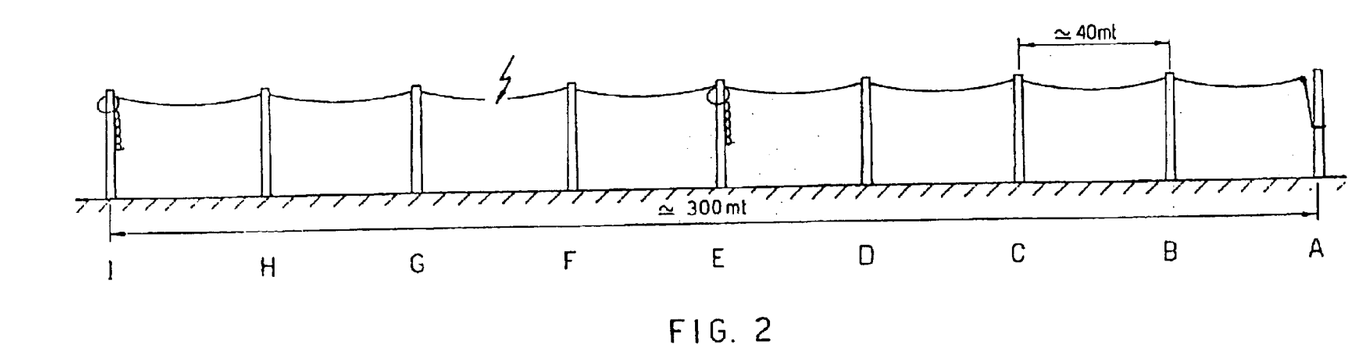
FIG. 2 is a schematic representation of an overhead telecommunication line extending along a plurality of posts arranged on a rectilinear path.

The use of this "mooring" or anchor device may be better illustrated if reference is made to FIG. 2, corresponding to a method of use of the disclosed devices. In particular, said figure schematically shows a sequence of posts arranged along a rectilinear path, wherein the equidistant posts denoted by E and I are considered to be sectioning/junction posts, while the remaining posts, are considered to be, for greater clearness, only transit posts.

Thus, supposing a failure has been noted and localised in the cable section extending from I to E, then, the following steps must be performed during the intervention:
1) the technician approaches the post E, and using the special rod equipped with a rope sustaining support and a section breaking device—the latter being widely described later on—, hooks the chain and releases it from the safety retainer;
2) he removes the small rope from its support on the rod, and while exerting a small downward traction force, he releases the chain from the retainers where it is anchored;
3) the release of the chain causes the lowering of the line to a level corresponding to the normal height of a human being; then, the technician locks—if necessary—the movable mooring device by means of a locking strap, and he cuts the damaged or broken cable;
4) he "temporarily" joins a new cable to the old one to be replaced;
5) he unhooks the chain from the post I as described in the above paragraphs 1, 2 and 3, he cuts the damaged or broken cable, and recovers the cable section to be replaced, up to the temporary junction carrying the new cable;
6) he joins the new cable to the outgoing one, and using the chain, he brings the movable mooring device again to its seat at the apex of the post; he hooks the chain to the fixing retainer and thereafter to the safety retainer, and then he puts the small rope again in its position in the special support provided on the rod, and unhooks the small rope from the chain;
7) at the post E, the technician snubs the replaced cable and fixes it to the self-gripping or self-pressing support; thereafter, he hooks the self-gripping support to the movable mooring device and performs the cable jointing operation, thereafter he releases the mooring device if it was locked, and brings it again to its seat in the ring shaped hook at the top of the post;
8) he fixes the chain to the fixing and safety retainers, and he recovers the small rope as described in paragraph 6).

Figure 3:
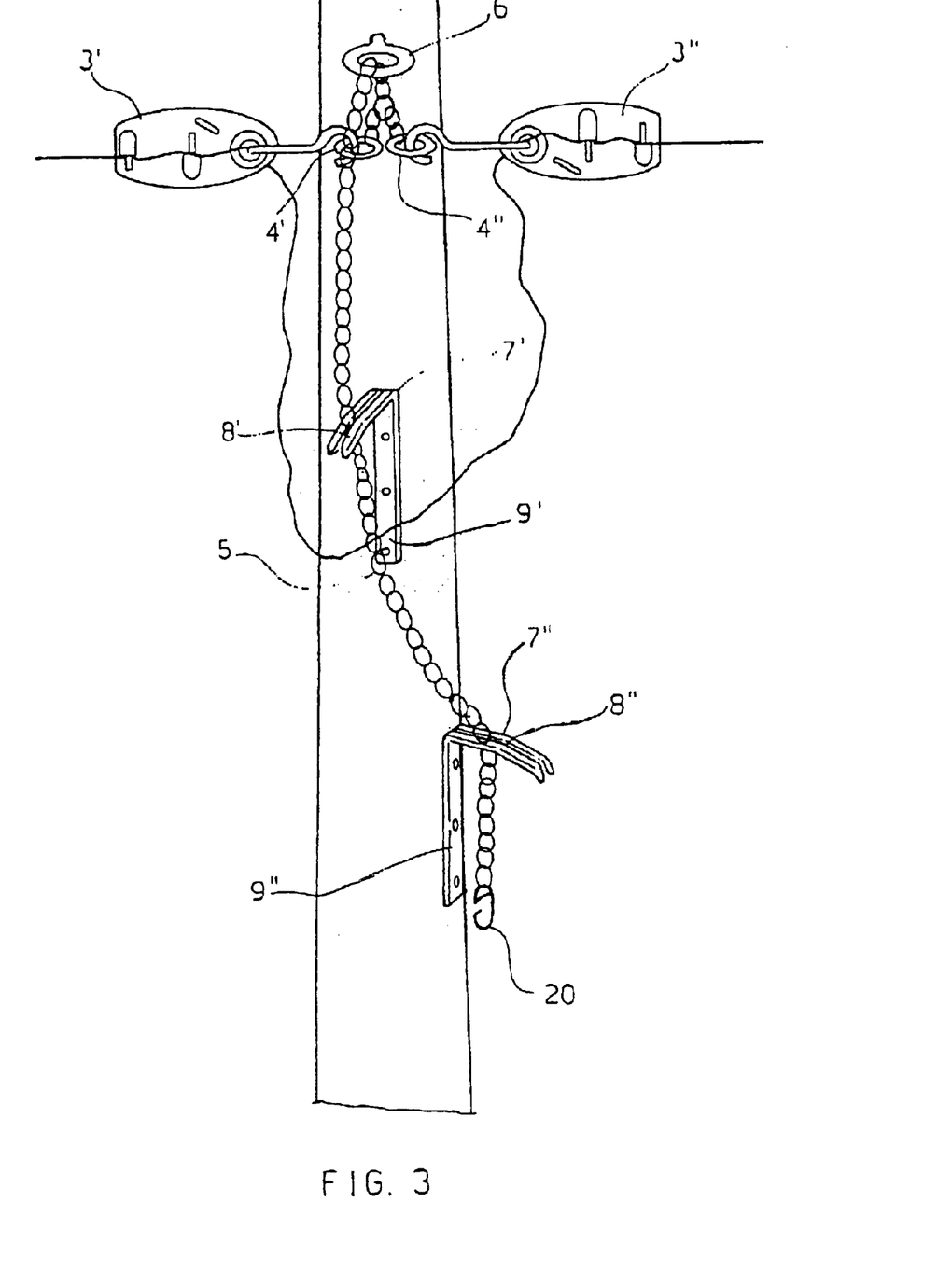
FIG. 3 is a schematic representation of a complete mooring or anchor device to be used on a corner post.

FIG. 3 exemplifies a movable mooring device for a corner post, which substantially operates according to the above described steps concerning a movable mooring device for a sectioning/junction post, but which has specific features distinguishing it both functionally and structurally.

In fact, as schematically shown in FIG. 3, the couple of self-gripping or self-pressing supports 3', 3" is respectively anchored or "moored" on two supporting eyelets, 4', 4", which form the end elements of a chain-guide 5, which may slide through a ring 6 rigidly connected to the post, thereby allowing the lowering of the line located at the span level, to the ground level, and the subsequent lifting at the end of the maintenance intervention. The outer diameter of each eyelet 4', 4" exceeds the inner diameter of the ring 6, in order to prevent their sliding through the ring itself, when the line is lifted again to its upper level.

Therefore, basically, it is possible to distinguish two different specific positions of the cable and its supports:
I) the line is in its operative position at the span level, where in the chain 5 sustains the two self-gripping supports 3', 3" and the chain 5 itself is retained by means of a first, or fixing retainer 9', and by a second, or safety retainer 9", which are both arranged in fixed positions on the post, wherein one of the retainers is located above the other and their mutual angular distance corresponds to 90°; the said elements 9', 9" for preventing the chain from sliding, are substantially configured in such a way as to comprise a flat portion to be fixed to the post surface, and an outgoing portion having two branches 8', 8" which widen outwardly in a flaring configuration, thereby allowing to receive the chain 5 and retain the latter, when it is pushed to the inside of limited width of the bifurcation 8', 8"; chain sliding is effectively prevented by the fact that the lateral dimension of a chain ring of the chain 5 is greater than the width of the space between the two branches 8, in proximity of the base 7;
II) the line is in the lowered position or maintenance state, wherein the chain 5, which still sustains both self-pressing supports 3', 3" by means of the two eyelets 4' and 4", has been released from said retainers or locking elements 9', 9" and has been made to slide while hooked by a small rope provided with an eyelet or loop, in such a way as to be able to bring the line again to the upper level, after the maintenance intervention.

Under a strict point of view of the design, taking also account of the order of magnitude of the dimensions involved, it is convenient to provide the ring hook 6 on the post at a height of 5.50–6.20 m, and to provide a corner chain 5, which is capable of sliding therein and having the two eyelets 4', 4", with a length comprised between 1 m and 1,20 m, the said chain hooking—as described above—the two self-gripping supports 3', 3" of the line.

At lower height, of 30–50 cm with respect to the ring hook 6, there is fixed the fixing retainer 9' and the safety retainer 9", on which the chain is locked.

In a further embodiment of the chain 5, the latter has an "Y" configuration, that is it as a branching off with two arms, each having a length of about 10 cm and an end forming an eyelet 4. This kind of bifurcated configuration of the chain allows its more versatile use under certain conditions, like the presence of differences in height (unevenness of the ground) or obstacles preventing the technician from operating from an optimum position. In fact, in this situation it may happen that during the unhooking operation by the technician, the chain will not be long enough to lower the line to the ground level of the countryside, since the different pile-driving levels may cause the cable to rise, on one side, for a certain distance. These extensions provided on the end of the chain, have the effect of making available an increased length and a certain degree of freedom in the movements, so as to facilitate the adjustment of the line through a momentary and moving away lowering movement or a momentary lifting and moving away movement.

The release of the chain 5 from its locking elements 9', 9", in order to perform the restoration of the line, and in order to adjust the descent stroke and lifting stroke of the chain, is obtained by means of special devices.

The use of these special devices, which will be described below, enables the technician to make these kind of interventions on the line, and prevents at the same time any act of vandalism.

In particular, in order to carry out the release operation of the mooring devices or anchor devices that have been described previously, and in order to perform other kinds of interventions which will be explained below, the technician avails himself of a telescopic rod 16 made of plastic reinforced by fibre glass, and of a set of replaceable terminal supports.

Figures 4A, 4B:
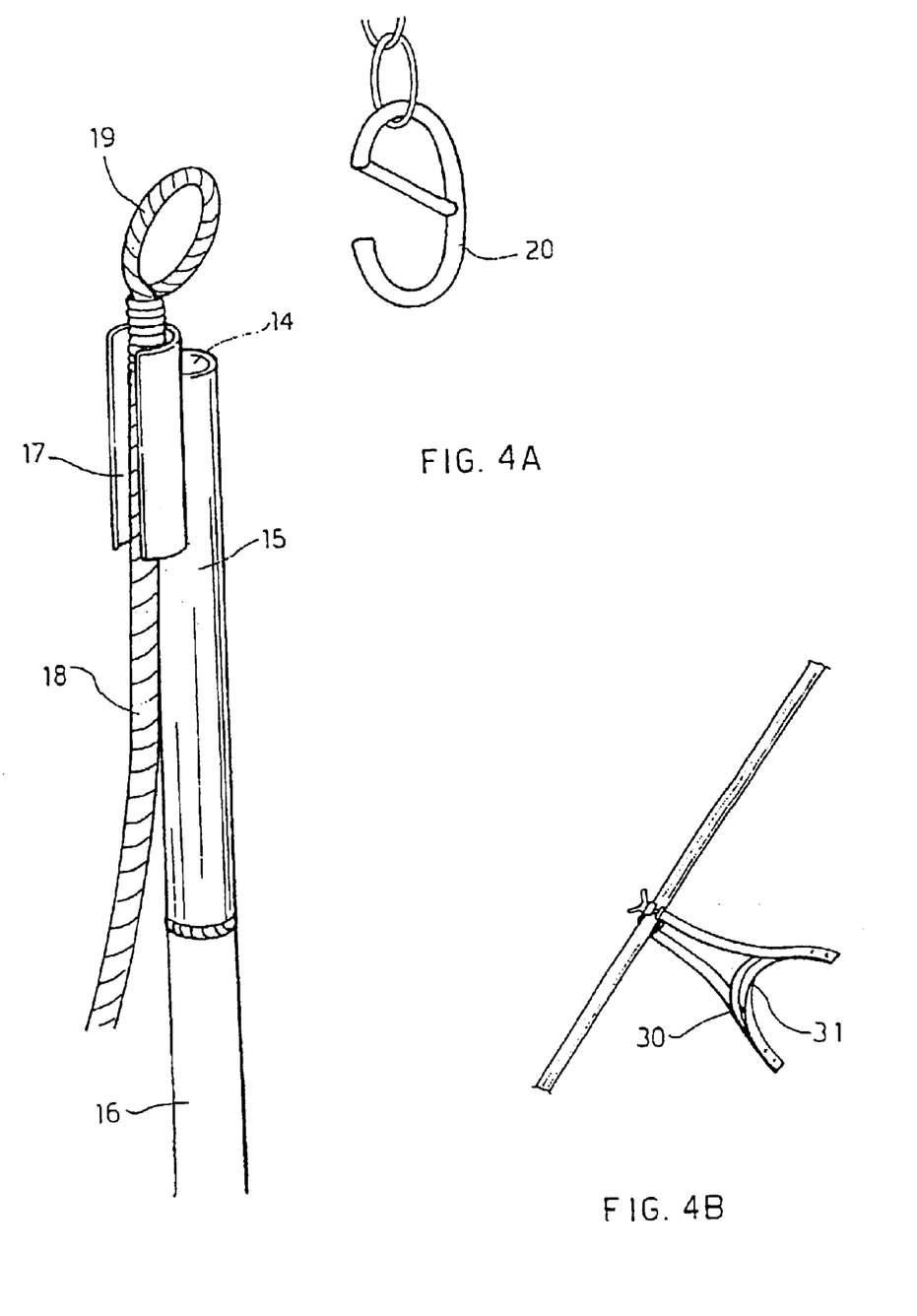
FIG. 4 is a schematic representation of a plurality of fittings or accessories in a movable mooring or anchor device.

For carrying out all kinds of interventions, on posts provided with the above specified equipment, the telescopic rod sustains a hollow transport device 15, of the kind shown in FIG. 4A.

This device substantially comprises two elements forming a single body:
- a hollow cylinder 14, of a slightly greater diameter than that of the telescopic rod 16, in such a way as to be fitted and retained thereon, and
- a portion of a hollow cylinder 17, which is open on one side, thereby allowing to insert therein a small rope 18 with a loop or eyelet 19.

In practice, when the technician releases or unhooks the line, he introduces first the loop or eyelet 19 of the small rope, on the hook 20 forming the lower termination of the chain 5, by using the telescopic rod; then, he removes the small rope 18 from its seat 17, and uses the small rope in order to unhook the chain 5 from the retainers 9' and 9". Thus, the chain 5 will be free to slide and will enable the lowering of the line under the action of its own weight, whereas the lifting operation and the locking in the retainers 9' and 9" may be performed at the end of the intervention, by pulling the small rope and therefore the chain 5 connected thereto by means of the hook 20.

Moreover, this telescopic rod is provided with a section breaking device, as shown in FIG. 4B, that is of a special element used to prevent undesirable oscillations and flexion of the support rod, during the various uses of the rod at a certain height above the ground level, both when the latter sustains an anchor or release device, and when it sustains a device for the introduction of the cable at the time the line is realised, as disclosed below.

From the structural point of view, this section breaking device forms a removable half-collar 30, which is fixed, depending on the kind of intervention, in an approximately intermediate and adjustable position on the rod—which is in fact 4 to 5 meters long—, in order to allow to perform an intervention at a predetermined height. Actually, due to this high length value, the rod could be subjected to flexion or oscillations, so that the arrangement of said section breaking device, provided with a concave portion 31 of the half-collar which faces the post and leans against it in a stable position, has the effect of eliminating said undesirable flexion and oscillations.

Figure 5:
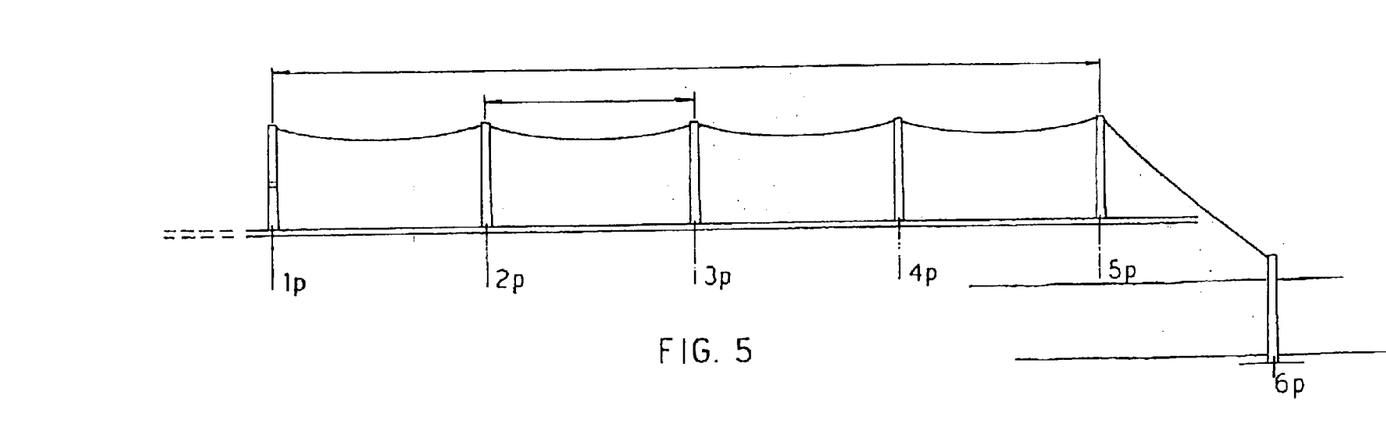
FIG. 5 is a further schematic representation of an overhead line for telecommunications, extending along a plurality of posts, with a change in direction of the line and a difference in height of the terrain between the posts $5p$ and $6p$.

The use of the mooring devices which have just been described, may be better understood with reference to FIG. 5, which refers to an intervention on a section of the line, which includes a difference in height and a change in direction.

In the situation which is schematically shown, it is supposed that the lowering of the overhead line to the ground level of the countryside, is performed by means of a chain with two arms, provided on the post 5p, at which location the line changes in direction and crosses a road of a farm.

Supposing the existence of a failure at 150 m, it is decided to replace the cable section starting at the distributor supporting post and ending at the post 5p. Then, the following operative steps may be identified:

1) the technician approaches the post 5p, and by means of the special rod, equipped with the small rope support and with the section breaking device, hooks the chain and releases it from the safety retainer;
2) he removes the small rope from the small rope support on the rod, and by means of a pulling action exerted first externally and then upwardly, he unhooks the chain from the fixing retainer;
3) the release of the chain causes the lowering of the line to the ground level, so that the damaged cable to be replaced may be removed from the self-pressing support and may be cut; then, the line can be brought again to a safety level by fastening the small rope at the post base; subsequently, a new cable is "temporarily" jointed to the old cable to be replaced;
4) at the location of the distributor-supporting post, 1p, the self-gripping or self-pressing support is released from the small band which retains the elliptic collar—see details below—;
5) the old cable to be replaced is recovered up to the temporary joint which holds the new cable;
6) at the location of the post 5p the line is once again lowered to the ground level, the new cable is jointed to the outgoing one, whereafter the line is again lifted to the operative level;
7) the chain is hooked to the fixing retainer 9' and to the safety retainer 9", in this order, and then the small rope is again inserted inside the special support on the rod, and is released from the hook 20 forming the lower termination of the chain;
8) at the location of the distributor support post, 1p, the cable is snubbed and fixed to the self-pressing support, while the latter is hooked to the small band which retains the elliptic collar;
9) the small cable is connected to the distributor.

For what concerns the equipment of the starting post, on the other hand, the problem briefly amounts to the fact that the latter supports four cables which are connected—that is screwed—to a distribution box, and are made to extend upwardly, till they reach the line span level; in conventional overhead lines, the said box is fixed at 3.50 meters, and the cable extends upwards to a height of 5.50 meters, in order to be introduced inside the self-gripping, two-way support. More specifically, these cables extend from a terminal board and are lodged inside a plastic-made protection raceway, which reaches the top of the post, where the cables of the span are tensioned by means of the self-gripping two-way supports, which are fixed by means of a threaded pin to the post itself, at the span level. Due to the fact that these pins are permanently driven in the post, the mooring device is itself fixed, so that the self-gripping two-way device can in no way be removed, lowered to the ground level, and lifted again to the operative position.

Figure 6:
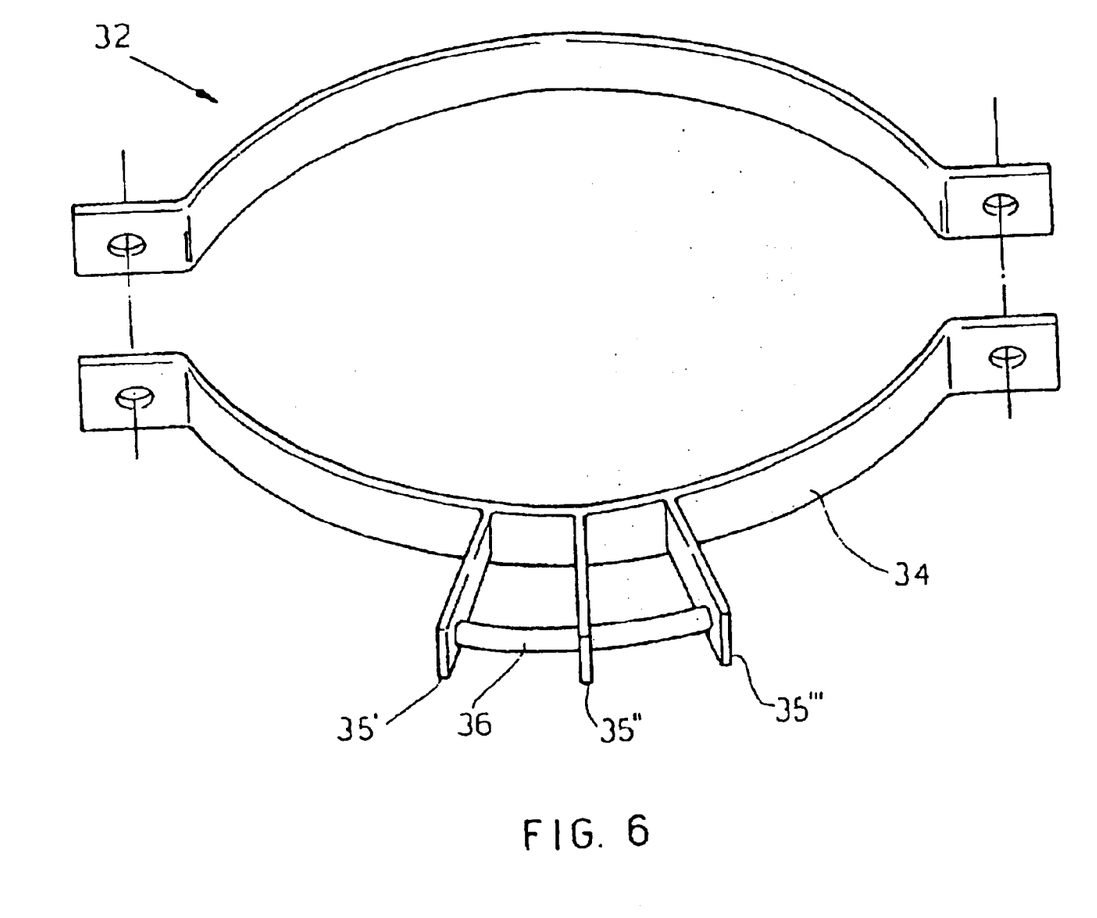
FIG. 6 is a schematic representation of an accessory or fitting, having a the shape of a collar.

According to the method devised by the present invention, the self-gripping support is not fixed anymore at the upper position, integral to the pin, but is fixed instead to a collar of the kind illustrated in FIG. 6; in practice, above the distributor, and at a height of 3.30 m, there is fixed an elliptic collar 32 with band retainer, to which there is anchored a couple of self-gripping supports, supporting one or more cables, whereas at a height of between 5.50 and 6.20 meters, there is positioned a mesh collar for hooking the two-way cable guide, for the transit of the line at span level.

The elliptic collar 32 comprises two half-collars, which enclose the whole circumference of the post. FIG. 6 shows the most significant half-collar 34, for the purpose of the invention, which is characterised by the fact that it comprises a support structure for the self-gripping devices. In fact, the three projecting small rods 35', 35", 35'", and the transversally inserted rod iron 36, make up the hooking element for the self-gripping supports, as the rod iron 36 is separated by the central projecting element 35″ in two distinct sections, each of which may support a self-gripping two-way device.

Since the latter is arranged at a height of 3.30 meters, the technician may reach said supports by using a single ladder element, thereby noticeably reducing the risks of the intervention. Moreover, the access of the technician at a height of 3.30 m is already foreseen during ordinary maintenance, since the technician must in any case reach the terminal board in order to perform ramification (branching-off) interventions: therefore, he may in the same way have access to the collar 34 in order to effect maintenance interventions on the starting post.

The collar has been realised in such a way as to be capable of supporting two self-gripping two-way devices, and since each self-gripping device is suited to hold two cables, it is possible to implement a line with four cables, complying in this manner with the body of technical rules, according to which the number of single cables must be less than five in the realisation of subscriber's overhead lines.

The collar described in the above section and used in a starting post, is also of fundamental importance for the equipment of posts used in overhead lines crossing roads or the like.

In fact, also in this application, the elliptical collar 32 with band retainer is fixed at a height of 3.30 meters, and the two self-gripping supports which support the line, are anchored thereon.

At a height comprised between 5.50 m and 6.20 m, there is fixed a further elliptical collar, and to the latter there is fixed the steel rope which supports, by means of clamps or clips, a PVC tube containing the overhead line which crosses the road. At a smaller height, there is positioned the mesh collar, to which there are hooked the incoming and outgoing two-way cable guides.

Figure 7:
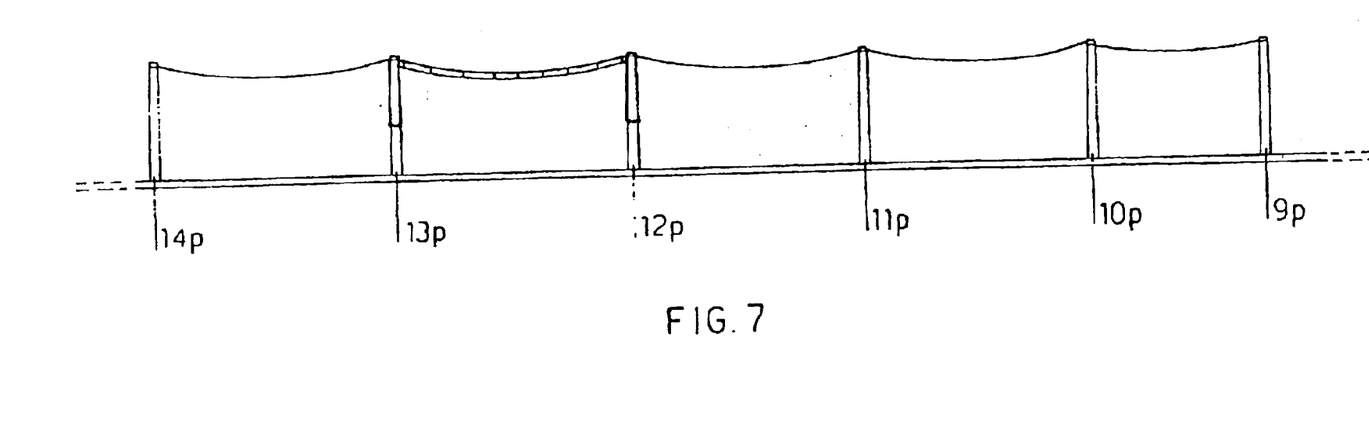
FIG. 7 is a schematic representation of an overhead line for telecommunications, comprising a crossing section.
Figures 8A, 8B:
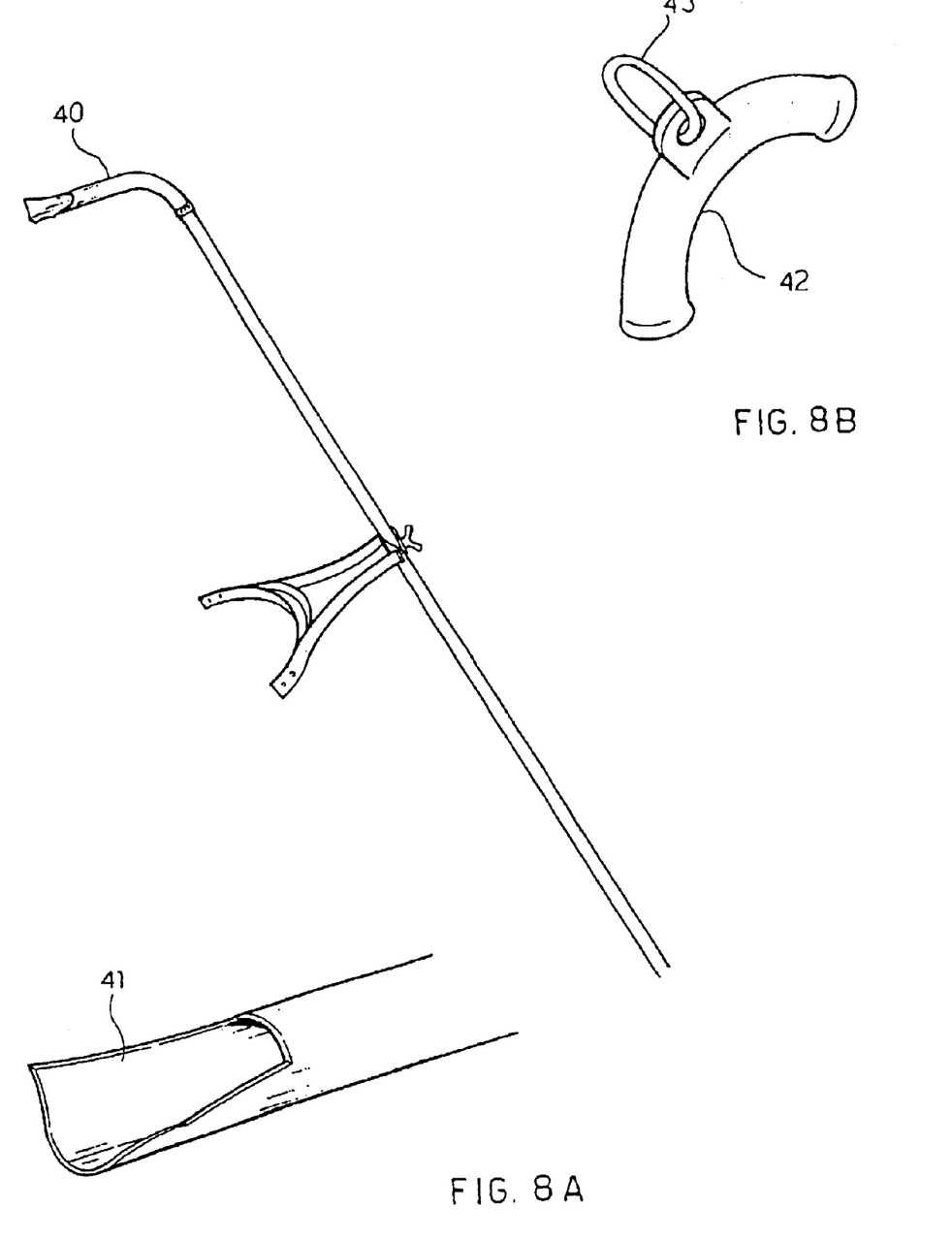
FIG. 8 is a schematic representation of a further set of devices, accessories or fittings, for a movable mooring device.

To carry out the intervention on the line section, in order to replace the cable on a crossing cable span, the following two steps are provided for, as schematically shown in FIG. 7:

the technician approaches a first post 12p and releases the damaged cable to be replaced from the self-gripping device, he cuts the cable and temporarily joints it to a new cable;

he approaches the other post 13p, releases the damaged cable from the self-gripping device, and pulls it towards himself until he finds the temporary joint which carries the new cable;

he fixes the new cable on the self-gripping device and he definitively joints it to the outgoing (continuing) cable;

he goes back to the post 12p, snubs the cable, fixes it in the self-gripping device, and effects the definitive joint with the outgoing cable extending in the other direction;

In FIGS. 8A and 8B there are shown further accessories or devices used for the realisation of the apparatus of the invention. FIG. 8A shows the telescopic rod carrying the special section breaking device 30.

Figure 9:
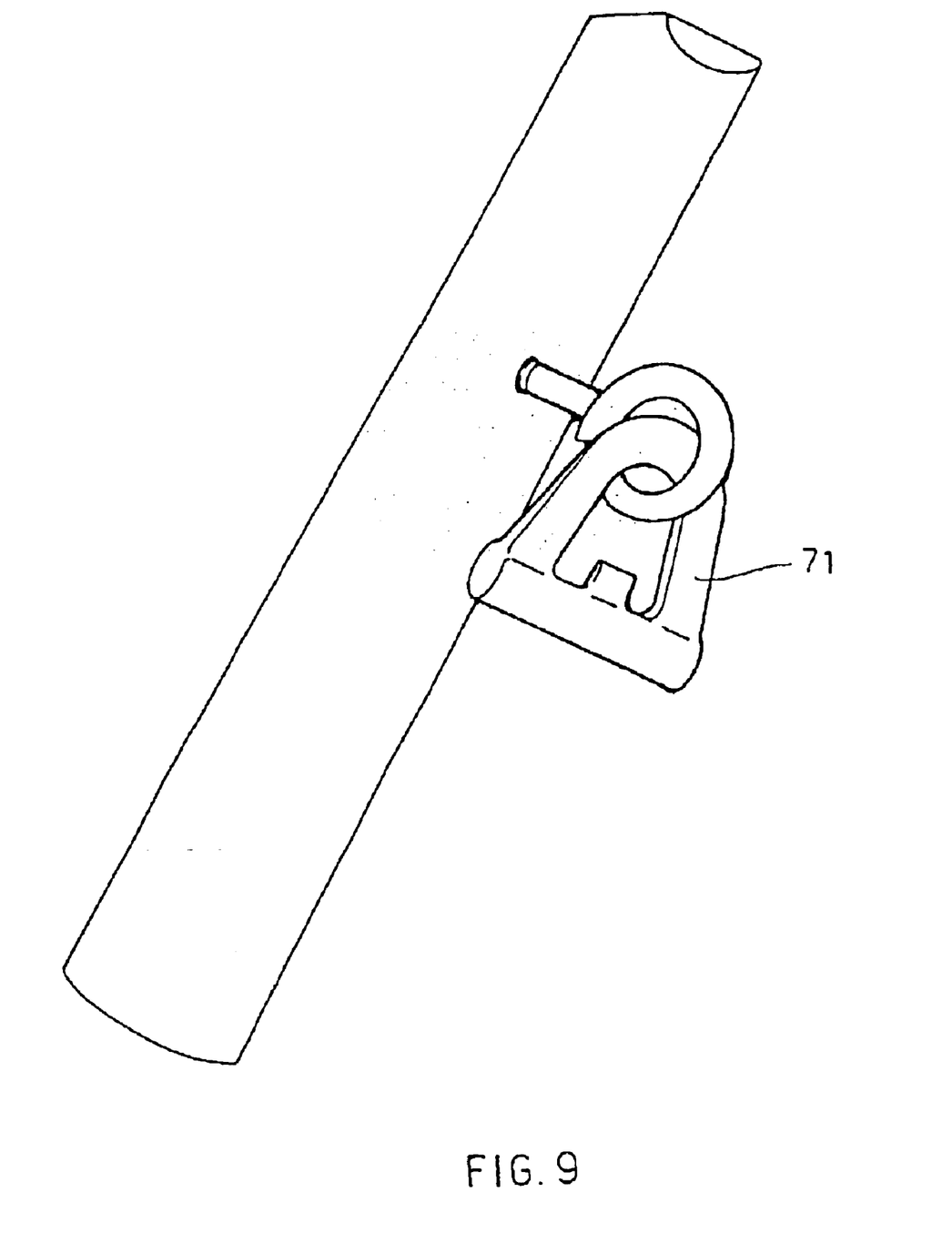
FIG. 9 is a schematic representation of a cable-supporting device, and of the associated pin with the sustaining ring.

The telescopic rod, in this case, carries at its distal end a buckle-supporting and probe-guiding support, which is bent to an "L" shape and has an exit aperture 41 which is cut away and flared. This specific configuration of the device allows to receive the cable supporting buckle 71 of FIG. 9, and moreover, the introduction of a probe which is made to slide inside the cable supporting buckles 71 of the transit posts, carrying directly from the ground the cable to be installed or replaced, till it reaches its predetermined position.

Particularly for the starting posts, the probe-guiding support 40 has the most advantageous configuration in order to insert the probe and the cable, together, inside a sleeve 42 of the kind shown in FIG. 8B, which may be oriented and which is anchored to a hook of the post by means of the ring 43.

Figure 10:
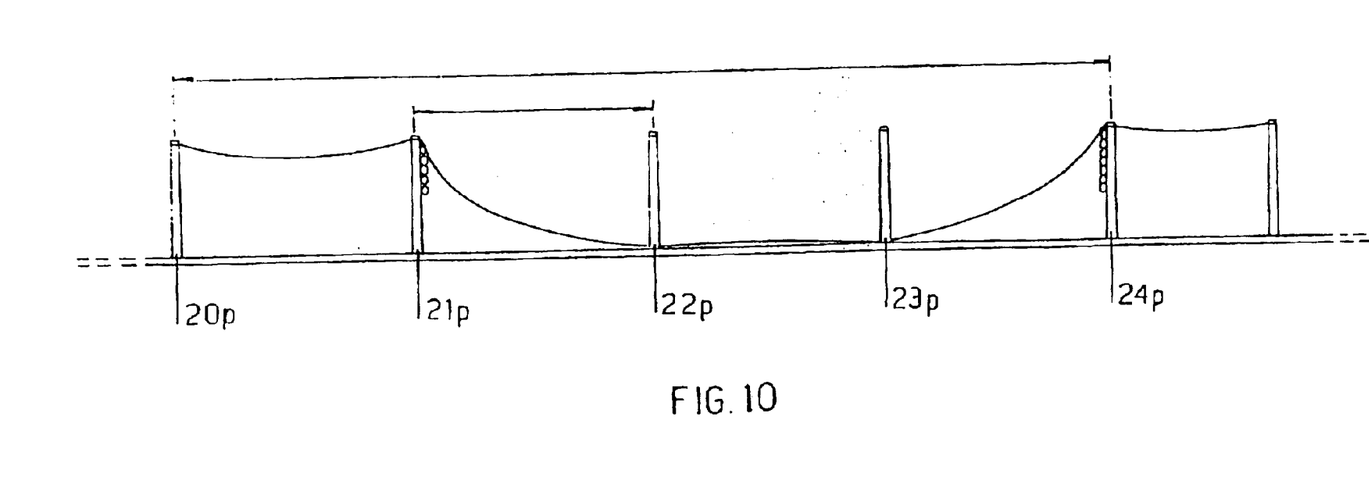
FIG. 10 is a further schematic representation of an overhead line for telecommunications, which extends along a plurality of posts, used to explain the steps of an intervention in which a cable is removed from the corresponding buckle.

The use of the devices which have been just described, may be better understood by referring to FIG. 10, for instance, which exemplifies a maintenance intervention of cable replacement, when the latter has come out of the buckles due to mechanical breakage, wherein the following steps are provided for:

1—at the post 24p, the technician lowers the line to the countryside ground level, and cuts the cable to be replaced;

2—at the central post 23p the technician, by using the telescopic rod and a probe-guiding support, causes the probe to slide inside the cable-supporting buckle 71, from the left to the right, that is, with regard to FIG. 10, in the direction from 23p towards 24p;

3—he temporarily joints the new cable to the head of the probe;

4—he pulls the probe again in order to thread the cable in the buckle;

5—he goes to the post 22p which precedes the central post 23p and repeats the operation already described;

6—at the post 21p he lowers the line to the countryside ground level, he cuts the old cable and joints the new one to the outgoing cable (cable continuation) and he lifts the overhead line back to the span level;

7—he goes to the post 24p, snubs and fixes the new cable to the self-gripping device, he realises the joint with the outgoing cable, and finally brings the line again to the operative position.

Industrial Applicability

Interventions performed for test purposes, on the plants installed as described above, have lead to optimum results with regard to the total time needed for the intervention, and with regard to the effectiveness of the final result of the intervention.

It is obvious from the description, that the system is versatile and is certainly not configured for a single typology of posts. Taking account of the variety of orographic conditions of the terrain where the posts are installed, it may be noted that the system disclosed by the present invention has solved all possible cases which may arise in practice (although it frequently happens to have the possibility to work on a completely rectilinear section of the line, this situation may be only theoretically generalised to all situations, since technicians often have to deal with continuos changes in direction, road crossings, difference in height due to orographic reasons, environment modifications, etc.). A further advantage may be seen in the modularity of the devices of the present invention, so that the technician who knows the kind of intervention and the type of section where the latter is to be performed, may select in advance the set of devices he needs. In any case, the greatest advantage is obtainable when the complete set of devices is available, since a single technician is thereby enabled to always perform resolutory operations at the time of first intervention and under completely safe conditions, even if he does not know in advance neither the kind of failure or defect, nor the technical/environmental condition of the posts and of the terrain.

What is claimed is:

1. A movable apparatus, for mooring or anchoring self-gripping supports in a telecommunication line, in which the mooring or anchor device of self-gripping two-way devices which carry cables, is made integral with a movable structure, which may freely slide a along a sustaining post, said structure comprising an anchor chain (25), allowing lowering of the line to ground level and successive lifting of the line to the operative position at the end of maintenance; said lowering of the line being obtained by exploiting the gravity force acting on the line itself, and the subsequent lifting to the operative position of said mooring or anchor device, being obtained by a traction of said anchor chain exerted by the operator, said apparatus being, characterised in that it is positioned on a post and in that said chain supports an anchor element (21) having an inverted "U" configuration, on which there are welded two spacers (22', 22") with a flattened elliptical shape, which are hooked by four self-gripping supports; the said chain adapted slides through an upper, shaft bearing ring (27'), and through a lower, shaft bearing ring (27'), in order to allow the lowering or the lifting of the line, and the said chain being fixed to a first hook and a second hook, wherein said chain is to be locked in a first position to the first hook (28) at about 4.00 meters of height, and in a further, more elevated position, at about 5.00 m, to the second hook, in which said chain is fixed.

2. A movable apparatus according to claim 1, characterised in that said chain has a length of 2.50 meters.

3. A movable apparatus according to claim 1, characterised in that it comprises telescopic means allowing the access to the post and the respective mooring device, and interacts with a set of interchangeable supports, including a device with a hollow double cylinder (15), a buckle-supporting and probe-guiding support (40) and a section breaking device (30).

4. A movable apparatus according to claim 3, characterised in that the hollow double cylinder (15) comprises two integrally formed elements: I-a firs hollow cylinder (14) having a slightly greater diameter than the diameter of the telescopic rod (16), so as to be fitted and retained on the latter, and II-a section of a hollow cylinder (17), which is open on one side, in such a way to allow the insertion of a small rope (18) which supports a rope loop (19).

5. A movable apparatus according to claim 3, characterised in that said section breaking device (30) is a removable half-collar, which is fixed in an intermediate and adjustable position along the telescopic rod, in order to ensure its safe use at a certain height, thereby eliminating any flexion or oscillations of the rod; the said section breaking device being positioned so as to face the post with the concavity of its half-collar, thereby leaning on the post and ensuring stability of the post.

6. A movable apparatus according to claim 3, characterised in that the buckle-supporting and probe-guiding support (40) has a bent, L-shaped configuration, with its exit opening (41) partially cut away and flared, thereby being suited to receive a cable supporting buckle (71) and allowing the insertion of a probe, which is slid inside the cable supporting buckles of the transit posts, and allows carrying the cable to be installed or replaced.

7. A movable apparatus mooring or anchoring self-gripping supports in a telecommunication line, characterised in that it is located on a post, and in that it comprises a pair of self-gripping supports respectively moored to two support eyelets (4', 4") forming end elements of a guide-chain (5), wherein said guide chain is, by sliding inside a ring (6) integral with the line, lowers the line and subsequently lifts the line to an operative position after maintenance, by the use of a small rope (18); the chain (5) being locked by a first retainer (9), and by a second retainer (9'), both retainers being rigidly connected to the post at different heights; said retainers (9', 9") comprising a flat portion to be fixed to the surface of the post, and a projecting portion forming a bifurcation (8', 8'), which widens outwardly and is flared, so as to allow the insertion of said guide-chain (5) and the locking of the guide-chain, once the guide-chain has been pushed towards an inner narrowed portion of the bifurcation (8', 8').

8. A movable apparatus according to claim 7, characterised in that said guide-chain (5) has a length of 1.20 meters.

9. A movable apparatus according to claim 7, characterised in that it comprises the guide-chain (5) of 1.20 meters of length, having a "Y" configuration, including a ramification with two arms, each having a length of the order of 10 cm and ending respectively in an integrally formed eyelet.

10. A movable apparatus according to claim 7, characterised in that it further comprises an elliptic collar (32) with a retainer band, including two half-collars; one of said collars being provided with three projecting elements having a transversely inserted rod which forms the anchor element, and the central one (35") of said projecting elements separating the rod iron in two sections; each of these sections supporting a self-gripping two-way device and its respective cables.

11. A method for maintenance of overhead lines for telecommunications, characterised in that for the replacement of a cable in a long, rectilinear line section, the following operative steps are performed:

I-at a first sectioning post (E), an operator hooks and releases a chain from a safety retainer, using a rod, with the support of a small rope and a section breaking device; II-the operator removes the small rope from its support on the rod, and by exerting a slight downward traction, unhooks the chain from a fixing retainer; III-the unhooking of the chain, causes the downward displacement of the lines to a height corresponding to an individual's average height; then, the movable mooring device is fixed on the post by means of a locking strap, and the cable is cut;

IV-a new cable is temporarily joined o the old cable to be replaced;

V-the chain is released from a second sectioning post (I), and the cable is cut and recovered up to the temporary joint carrying the new cable;

VI-the new cable is joined, and through the chain, the movable mooring device is brought back to a seat at the top of the second post; the chain is hooked to the fixing retainer and then to the safety retainer, and the small rope is inserted again inside its support on the rod, and finally the small rope is unhooked from the chain;

VII-at the first sectioning post, the operator fixes the cable to the self-gripping support and snubs it; then, the self-gripping support is hooked to the movable mooring device and a junction is formed; then, the device is released, and is brought back to its seat in the ring hook at the top of he post;

VIII-the chain is fixed to the fixing and safety retainers and the small rope is recovered.

12. A method as in claim 11, wherein an extended section of the lines and a change in direction are, characterised in that for the replacement of a cable along said extended section and a change in direction, the following steps are performed:

I-a technician (a) detaches the cable to be replaced, from a distributor;

II-another technician (b) approaches a post (5), unhooks the chain in order to lower the overhead line, releases the old cable to be replaced from the self-gripping support and cuts it; then, he temporarily joins the old cable to the new cable, and brings the lines again into a safety position at a predetermined height;

m-the first technician (a) operating from a distributor supporting post (1p), unhooks the self-gripping support from a band retainer of a mooring collar, releases the old cable, and by pulling it towards himself, begins to recover the same;

IV-after he has found the temporary joint carrying the new cable, the technician (a) releases the new cable and communicates this fact to the other technician (b);

V-the other technician (b), from the post (5p), lowers the line again, and locks the cable in the self-gripping support, effects the joint, brings the line again to its operative position at the predetermined height, and finally fixes the chain to the fixing and safety retainers;

VI-from the distributor supporting post, the technician (a) snubs the cable, hooks the self-gripping support to the mooring or anchoring collar, and performs an electrical connection of the line in order to restore service.

13. A method according to claim 12, said overhead line including a section thereof which crosses a road, characterised in that for the crossing of road, a PVC tube is used which has an internal diameter of a size allowing the transit of cables, so that the repair or replacement of these cables may be performed without being forced to lower the line to the road level, and therefore without blocking vehicle traffic.

14. A method according to claim 13, characterised in that for the replacement of a cable at a crossing span, the technician makes use of the following steps, while working at the distributor's height:

I-at the location of the first crossing post (12p), he releases from the self-gripping support arranged at the distributor level, a damaged or broken cable to be replaced, he cuts it, and temporarily joins the new cable; II-he goes to the other post (13p), releases the damaged or broken cable from the self gripping support located at the distributor level, and pulls it towards himself, until he finds the temporary joint carrying the new cable; he locks the new cable on the self-gripping support and effects the joint;

IV-he goes back to the initial post (12p), snubs the cable, locks it in he self-gripping support, and forms a joint.

15. A method according to claim 11, said overhead line including a section thereof which crosses a road, characterised in that for crossing of the road, a PVC tube is used which has an internal diameter of a size allowing the transit of cables, so that the repair or replacement of these cables may be performed without being forced to lower the line to the road level, and therefore without blocking vehicle traffic.

16. A method according to claim 15, characterised in that for the replacement of a cable at a crossing span, the technician makes use of the following steps, while working at the distributor's height:

I-at the location of a first crossing post (12p), he releases from the self-gripping support arranged at the distributor level, a damaged or broken cable to be replaced, he cuts it, and temporarily joins a new cable; II-he goes to the other post (13p), releases the damaged or broken cable from the self-gripping support located at the distributor level, and pulls it towards himself, until he finds the temporary joint carrying the new cable; he locks the new cable on the self-gripping support and effects the joint;

IV-he go a back to the initial post (12p), snubs the cable, locks it in he self-gripping support, and forms a joint.

* * * * *